(12) United States Patent
McKenzie, Jr. et al.

(10) Patent No.: US 7,016,954 B2
(45) Date of Patent: Mar. 21, 2006

(54) SYSTEM AND METHOD FOR PROCESSING UNSOLICITED MESSAGES

(75) Inventors: William F. McKenzie, Jr., Raleigh, NC (US); Kelly A. Revels, Selma, NC (US)

(73) Assignee: Lucent Technologies, Inc., Murray Hill, NJ (US)

( * ) Notice: Subject to any disclaimer, the term of this patent is extended or adjusted under 35 U.S.C. 154(b) by 928 days.

(21) Appl. No.: 09/873,683

(22) Filed: Jun. 4, 2001

(65) Prior Publication Data

US 2002/0188715 A1 Dec. 12, 2002

(51) Int. Cl.
*G06F 15/173* (2006.01)

(52) U.S. Cl. .................. 709/224; 709/223; 719/318; 714/26; 714/39; 714/48

(58) Field of Classification Search .............. 709/223, 709/224; 719/318; 714/26, 39, 4
See application file for complete search history.

(56) References Cited

U.S. PATENT DOCUMENTS

| | | | | |
|---|---|---|---|---|
| 6,006,016 A | * | 12/1999 | Faigon et al. | 714/48 |
| 6,131,118 A | * | 10/2000 | Stupek et al. | 709/223 |
| 6,167,448 A | * | 12/2000 | Hemphill et al. | 709/224 |
| 6,230,198 B1 | * | 5/2001 | Dawson et al. | 709/224 |
| 6,259,444 B1 | * | 7/2001 | Palmer et al. | 345/866 |
| 6,300,936 B1 | * | 10/2001 | Braun et al. | 345/156 |
| 6,564,341 B1 | * | 5/2003 | Sundaram et al. | 714/43 |
| 6,697,970 B1 | * | 2/2004 | Chisholm | 714/48 |
| 2001/0056508 A1 | * | 12/2001 | Arneson et al. | 709/318 |
| 2002/0099786 A1 | * | 7/2002 | Chun | 709/215 |
| 2003/0023408 A1 | * | 1/2003 | Wight et al. | 702/187 |

FOREIGN PATENT DOCUMENTS

| JP | 2000207372 A | * | 7/2000 |
|---|---|---|---|
| JP | 2000270043 A | * | 9/2000 |

* cited by examiner

*Primary Examiner*—Saleh Najjar
*Assistant Examiner*—Oanh L. Duong

(57) ABSTRACT

A system and method for processing an unsolicited error message is disclosed. Generally, a first computer is utilized comprising a transceiver, software stored within the first computer defining functions to be performed, and a processor configured by the software to perform the steps of: parsing an error message to determine an identification number that represents a most significant meaning of the error message; and, determining a description of the error message after parsing. The identification number is determined by dividing the error message into an identifier portion and a series of properties portion, wherein the identifier portion provides a general description of a cause of the error message, and the series of properties portion provides specific attributes of the error message. The identification number is then processed in accordance rules provided to the system for processing the error message.

14 Claims, 7 Drawing Sheets

| IDENTIFIER 242 | VARIABLE 244 | | | |
|---|---|---|---|---|
| | PROPERTY 1 | PROPERTY 2 | PROPERTY 3 | PROPERTY N |

FIG. 4

SYSTEM AND METHOD FOR PROCESSING UNSOLICITED MESSAGES

FIELD OF THE INVENTION

The present invention relates generally to network communication, and more particularly to a system and method for processing unsolicited messages.

BACKGROUND OF THE INVENTION

Unsolicited notification messages are typically sent by computer devices within a network to one or more predefined management stations to report status and abnormalities within the network. Such computer devices include, but are not limited to, routers, switches, hubs and servers that are connected to the network. The unsolicited messages that are sent to the management stations, report device and network abnormalities from many diverse products and technologies, as well as service problems.

The notification messages have unique product identifiers, product centric text, non-standard style formats, and inconsistent technical level content which results in very few of the notification messages being understandable by any typical network operation personnel. The notification messages are referred to as alarms, events, traps, syslog messages, and often contain variable contents that alter the meaning of the messages. Simple network management protocol (SNMP) traps are one example of the unsolicited messages.

As known in the art, a trap is an event that an SNMP enabled device, such as a router, transmits to a network management station, wherein the event is a change in the operation status of a router. SNMP traps often average over one thousand (1,000) characters in size and can utilize large amounts of network resources to process at the management station. In some environments, it is not unusual for millions of these notification messages to be generated on a daily basis. All of these notifications are typically logged to a single file, where they reside until they are eventually archived for long term storage.

The Internet engineering task force (IETF) has defined the structure and protocol for some of these SNMP traps, as well as defining the contents of five standard SNMP traps. Some products have "enhanced" these standards by adding additional variables to refine the meaning of the trap, which effectively make the trap nonstandard. The IETF addressed the unique requirements of the product by defining an enterprise specific SNMP trap, which allows each enterprise or product to define unique messages and variables that will be "enveloped" into the SNMP trap. While the enterprise specific SNMP trap provides a powerful function for defining enterprise specific traps, it also complicates standardization efforts.

In addition to these network device generated notifications, network management applications typically perform status polling or network interface reachability monitoring that often results in the generation of additional notification messages to report these reachability exceptional conditions.

Unfortunately, there is no method of translating these diverse notification messages into a common format and terminology, since each product vendor documents its own unique messages and the product vendors have no interest in working with their competitors to resolve the inconsistencies. To further complicate this process, the many acquisitions and mergers of products over the years has resulted in the same lack of standardization within individual company product lines. Many of these notifications report status with numerical values representing a status or textual meaning of parts of the entire message. The numerical values are referred to as enumerated values wherein the enumerations are unique to each product and technology, also requiring translation to human readable format.

Network operation managers find it difficult to build or maintain a staff to cover the many products, services, and technologies included in modern networks. Therefore, in many cases, critical status messages are logged with millions of other messages, with no indication of the critical message ever presented to the responsible manager because the meaning and importance of the message was not understood.

Complex communication networks and emerging technologies require new methods to monitor the status of all products, components, and functions that are part of these networks. Problem identification, symptoms vs. problems, and efficient correlation are becoming more difficult using current processes and tools.

SUMMARY OF THE INVENTION

In light of the foregoing, the preferred embodiment of the present invention generally relates to a system and method for processing unsolicited error messages. Generally, describing the structure of the processing system, a first computer is utilized comprising a transceiver, software stored within the first computer defining functions to be performed, and a processor configured by the software to perform the following steps. The processor first parses a received error message to determine an identification number that represents a most significant meaning of the error message. A description of the error message is then determined. The identification number is determined by dividing the error message into an identifier portion and a series of properties portion, wherein the identifier portion provides a general description of a cause of the error message, and the series of properties portion provides specific attributes of the error message. The identification number is then processed in accordance rules provided to the system for processing the error message.

The present invention can also be viewed as providing a method for processing unsolicited error messages comprising the steps of: parsing a received error message to determine an identification number that represents a most significant meaning of the error message, and, determining a description of the error message after the step of parsing the error message. As mentioned hereinabove, the identification number is determined by dividing the error message into an identifier portion and a series of properties portion, wherein the identifier portion provides a general description of a cause of the error message, and the series of properties portion provides specific attributes of the error message. The identification number is then processed in accordance rules provided to the system for processing the error message.

The invention has numerous advantages, a few of which are delineated here after as examples. Note that the embodiments of the invention, which are described herein, possess one or more, but not necessarily all, of the advantages set out hereafter. One advantage of the invention is that it provides a method for processing unsolicited messages without burdening system resources.

Another advantage is that it provides a standardized manner of processing unsolicited messages.

Other features and advantages of the present invention will become apparent to one with skill in the art upon examination of the following drawings and detailed description. It is intended that all such additional features and advantages be included herein within the scope of the present invention, as defined by the accompanying claims.

BRIEF DESCRIPTION OF THE DRAWINGS

The present invention will be more fully understood from the detailed description given below and from the accompanying drawings of the preferred embodiments of the invention, which, however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

FIG. 4 is a block diagram that illustrates portions of an error message.

DETAILED DESCRIPTION OF THE PREFERRED EMBODIMENT

The processing system of the present invention can be implemented in software, firmware, hardware, or a combination thereof. In the preferred embodiment of the invention, which is intended to be a non-limiting example, a portion of the system is implemented in software that is executed by a computer, for example, but not limited to, a server, a personal computer, workstation, mini computer, or mainframe computer.

The software-based portion of the processing system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Figure 1:
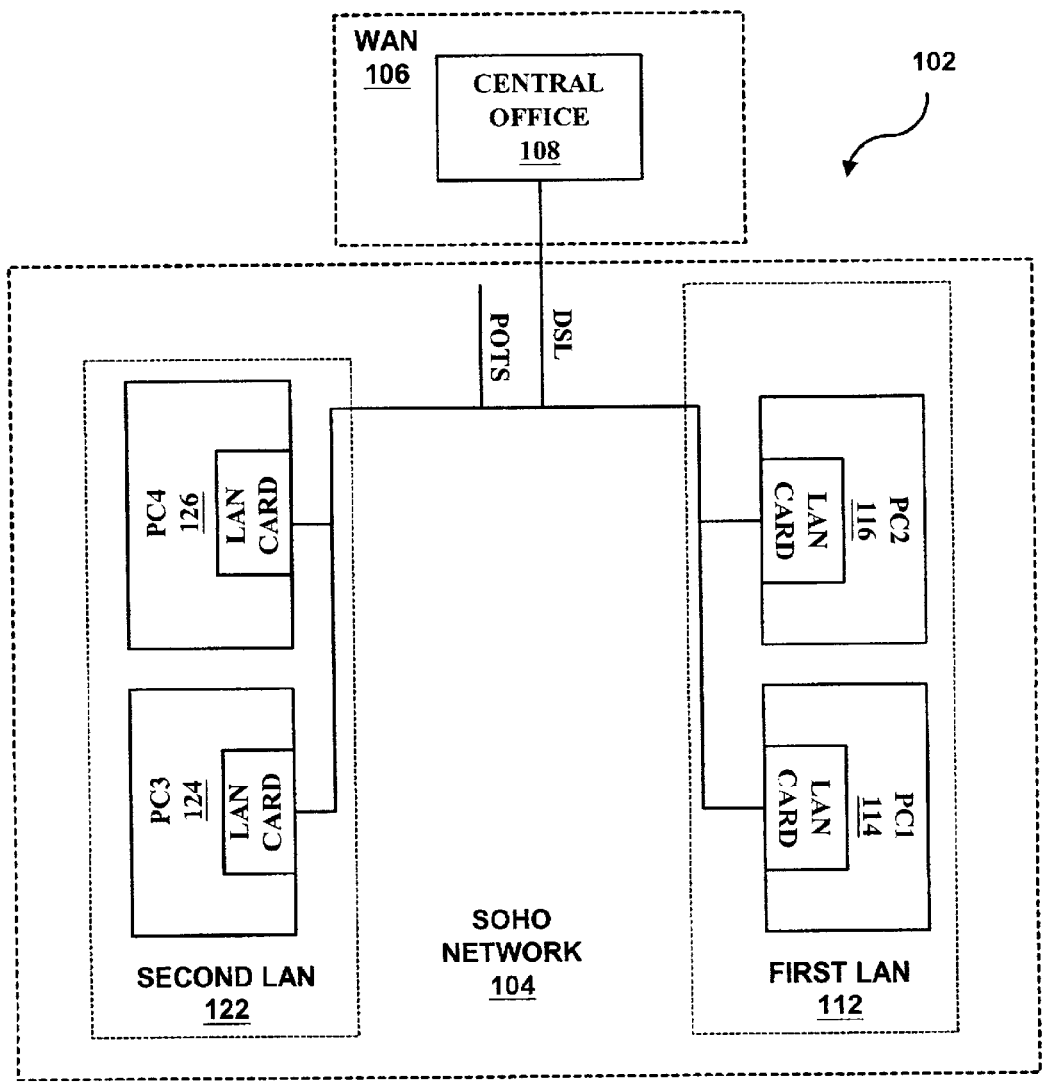
FIG. 1 is a block diagram illustrating a prior art software bridge/router system.
Figure 2:
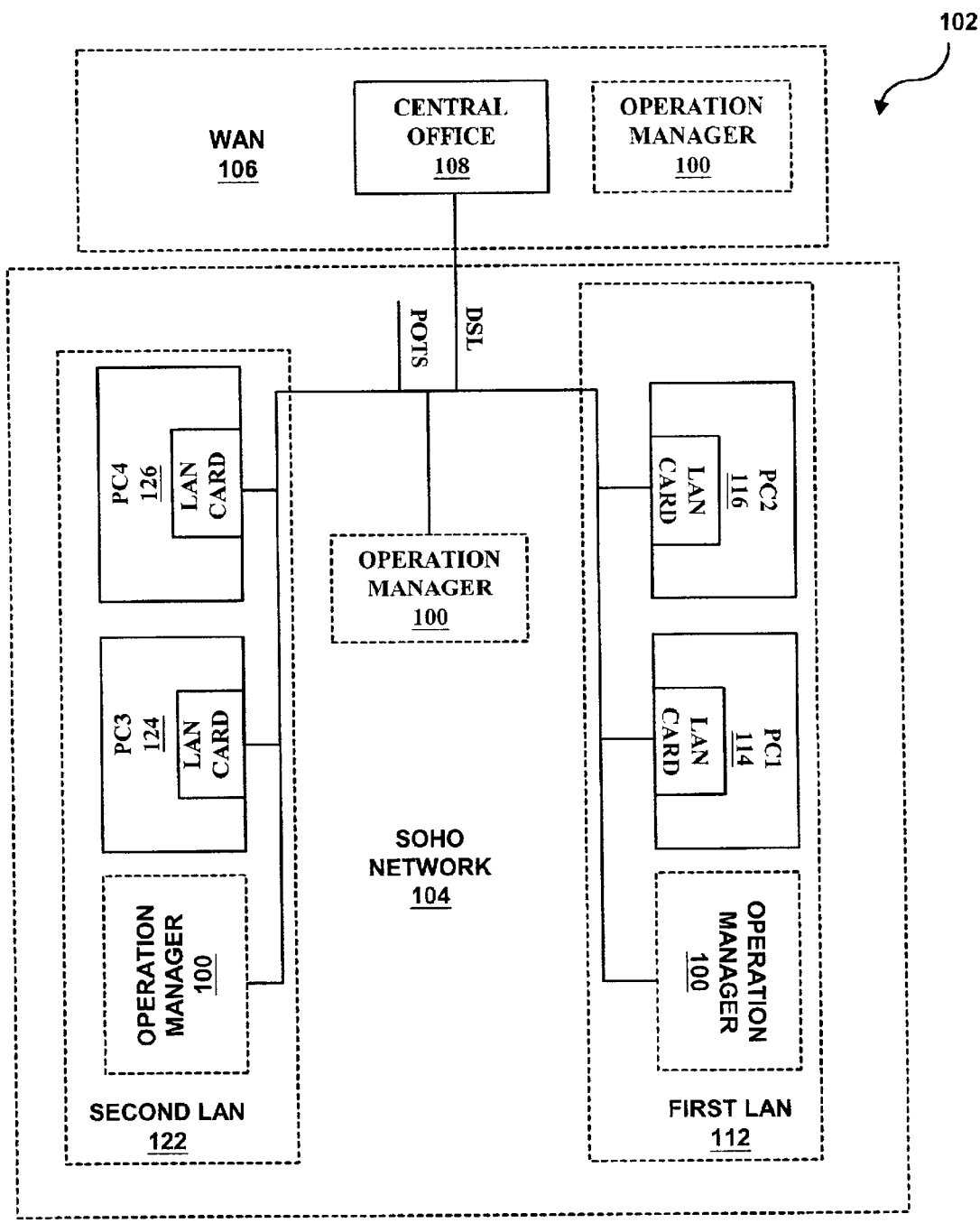
FIG. 2 is a block diagram that further illustrates the system of FIG. 1, wherein an operating manager has been provided in accordance with the preferred embodiment of the invention.

Referring now to the drawings, wherein like reference numerals designate corresponding parts throughout the drawings, FIG. 1 is a block diagram illustrating a prior art software bridge/router system 102 comprising a computer network located within a home, otherwise referred to as a small office, home office (SOHO) network 104, connected to a wide area network (WAN) 106, wherein an operation manager (not shown) may be provided. It should be noted that FIG. 1 is merely provided as an example of a communication network wherein the present operation manager may be implemented. It should be noted however that the present operation manager may be located within a different network, such as, but not limited to, a single local area network (LAN), a single SOHO network, or a single WAN. Further, in accordance with an alternate embodiment of the invention, the present operation manager may be provided in connection with two devices wherein unsolicited notifications of communication anomalies are provided to the operation manager. FIG. 2, described hereinbelow, provides for alternate locations of the operation manager.

Connection between the SOHO network 104 and the WAN 106 is preferably provided by a first digital subscriber line (DSL) modem located at the SOHO network 104 and a second DSL modem located at the WAN 106. As shown by FIG. 1, the SOHO network 104 comprises a first LAN 112 and a second LAN 122, either, or both of which are connected to a DSL and/or a plain old telephone service (POTS) line.

As known in the art, the WAN 106 comprises a central office 108 that provides for numerous types of services. Such services may include, but are not limited to, an asymmetric digital subscriber line (ADSL) services, high bit rate digital subscriber line (HDSL) services, symmetric digital subscriber line (SDSL) services, multi-rate digital subscriber line (MSDSL) services, and/or rate adaptive digital subscriber line (RADSL) services.

It should be noted that, while the present example describes use of two separate LANs within the SOHO network 104, one skilled in the art will appreciate that the number of LANs need not be limited to two, but instead may be more than two. In fact, the number of LANs within the SOHO network 104 may even be limited to a single LAN comprising a series of computers. Further, the number of POTS lines and DSL lines may also be different from the number illustrated within this example.

As shown by FIG. 1, the first LAN 112 comprises a series of computers therein, illustrated as PC1 114 and PC2 116. The second LAN 122 also comprises a series of computers therein, illustrated as PC3 124 and PC4 126. To provide LANs, each computer within the first and second LAN 112, 122 preferably contains a network interface card (NIC) that connects to a peripheral component interconnect (PCI) slot, thereby providing network capabilities within each respective network. Preferably, a LAN card is inserted into a PCI slot of its associated computer to provide networking capabilities such that the computers are logically connected as a first LAN and a second LAN.

Typically, as known in the art, if the first and second LAN 112, 122 are to be connected to allow communication amongst computers within the first and second LAN, a hub, such as, for example, a 10/100 Base T hub, is installed, along with the installation of special cables from each computer within the SOHO network 104 to the hub. All computers typically have a NIC, such as, for example, a 10/100 Base T NIC, installed. Finally, each computer within each LAN has software added/configured to allow all computers therein to begin operation in a LAN environment.

A network management application may be located at the central office 108, or other locations, which is capable of receiving and generating unsolicited notifications concerning network device status or abnormalities in various formats from different diverse products and technology providers. It should be noted that other devices may be located within the system 102 that have not been illustrated herein.

FIG. 2 is a block diagram that further illustrates the system of FIG. 1 wherein the operation manager 100 has been provided, in accordance with the preferred embodiment of the invention. As shown by FIG. 2, the operation manager 100 may be located within the first LAN 112, the second LAN 122, the WAN 106, or within the SOHO network 104 between the first and second LANs 112, 122. It should be noted that the operation manager 100 may be provided external to the SOHO network 104 and WAN 106 wherein a communication link is provided to connect the SOHO network 104 and/or WAN 106 to the operation manager 100. Further, it is not necessary for more than one operation manager 100 to be located within the system 102, although more than one may be provided.

Figure 3:
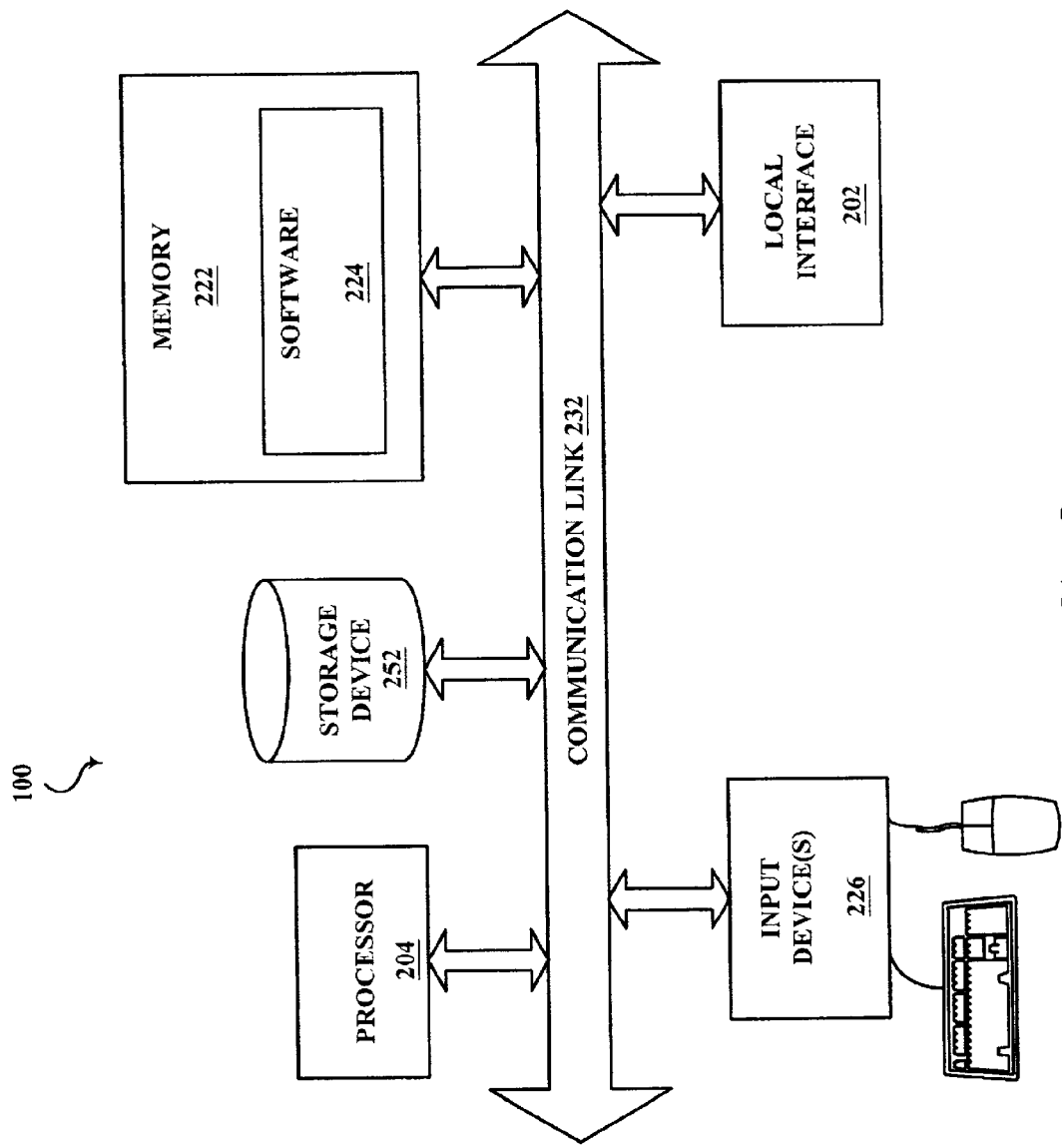
FIG. 3 is a block diagram that further illustrates the operation manager of FIG. 2.

FIG. 3 is a block diagram that further illustrates the operation manager 100 of FIG. 2. As shown by FIG. 3, a local interface 202 is located within the operation manager 100 for providing communication between the operation manager 100, and the WAN 106 and/or SOHO network 104. The operation manager 100 generally comprises a processor 204, a storage device 252, and a memory 222. Software 224 is provided within the memory 222 that defines functionality to be performed by the operation manager 100, as is defined in detail hereinbelow. The processor 204 accepts data from the memory 222 or a communication link 232, such as a bus(es) or a dedicated path. As an example, the communication link 232 may be a PCI bus.

The local interface 202 located within the operation manager 100 is preferably a PCI slot which is attached to the communication link 232 and provides for a peripheral device, such as a NIC card, to communicate with the WAN 106 (FIG. 2) and/or the SOHO network 104 (FIG. 2). An input device 226, or devices, may be connected to the operation manager 100 for purposes that are provided hereinbelow.

As known by those skilled in the art, notification messages, or error messages, that are attributed to devices, services, and/or software are defined by product/software engineers that are responsible for their respective devices, services, and/or software. As an example, a product engineer who has developed software to enable interaction between a network and a 10/100 Base T Hub also may define error messages that are associated with malfunction of the hub. Such errors may range from software errors to hardware errors.

Typically, the error messages are encoded by using a basic encoding rule (BER) that divides each error message into separate parts. FIG. 4 is a block diagram that illustrates portions of an error message. As noted hereinabove, the received error message is an encoded message. As shown by FIG. 4, a first part of the error message is an identifier portion 242. The identifier portion 242 of the error message generally is a unique identifier within the specific enterprise, such as an SNMP object identifier (OID). Generally, the description of the error message is defined within the enterprise product documentation or defined in a product management information base (MIB), as is the case for SNMP traps. As an example, if the problem encountered within the system 102 is that a hub is not receiving data, the variable portion of the error message may read, "hub is not receiving," or a numerical value, the enumeration of which means "hub is not receiving."

A second part of the error message is a variable portion 244. The variable portion 244 of the error message may comprise multiple properties. The variable portion 244 identifies specific attributes associated with the error message that further define the error message. As an example, if a first property (property 1) reads "hub is not receiving," a second property (property 2) of the variable portion 244 may read "hub inactive," and a third property (property 3) of the variable portion 244 may read "power on." The number of properties within a variable portion 244 need only be limited by the number of definitions of an error message an engineer wishes to define.

Figure 5:
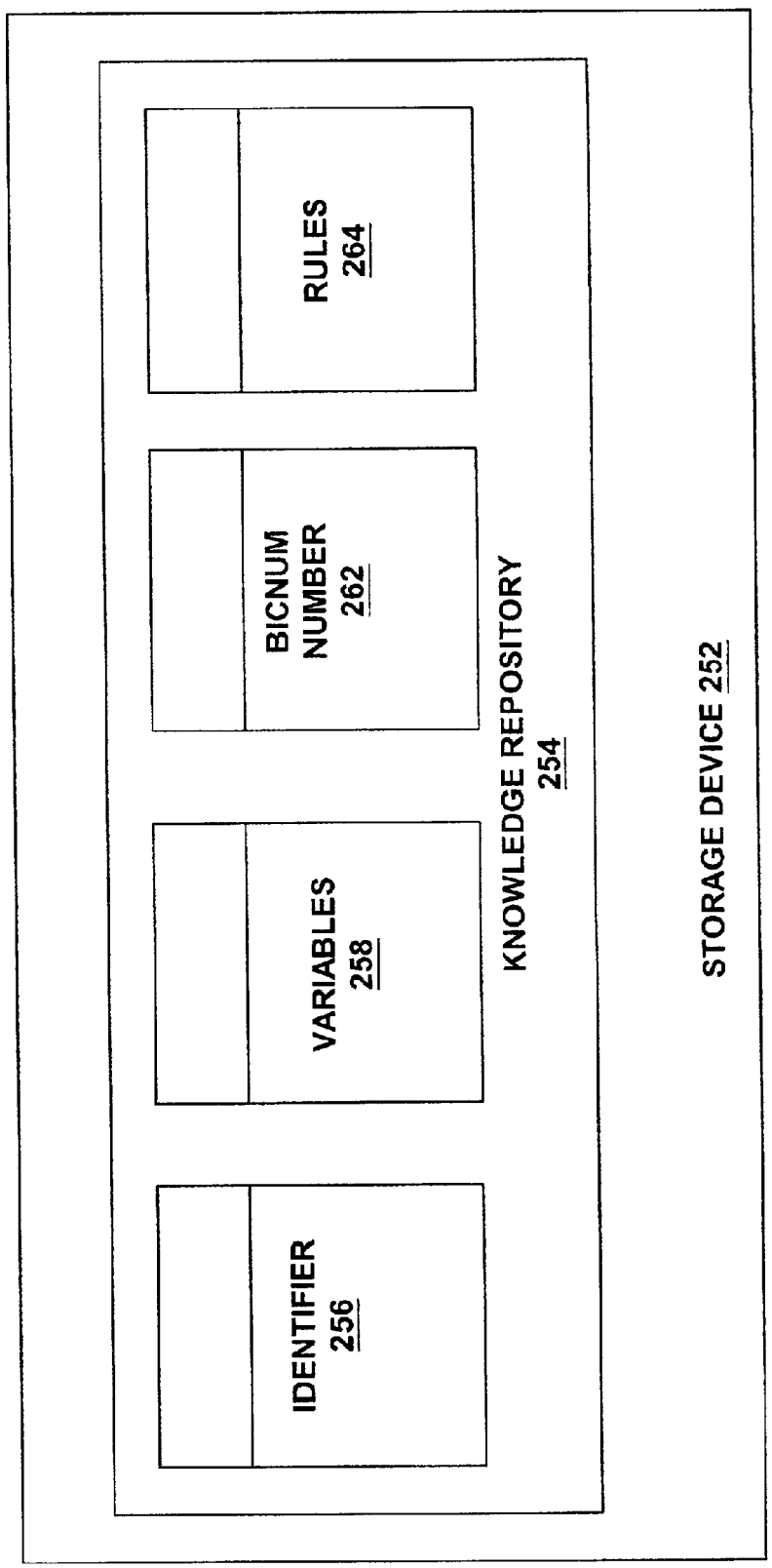
FIG. 5 is a block diagram that further illustrates the storage device of FIG. 3.

In light of the abovementioned, FIG. 5 is a block diagram that further illustrates the storage device 252 of FIG. 3. As shown by FIG. 5, a knowledge repository 254 is located within the storage device 252 for purposes of storing the abovementioned definition portions of error messages, as is explained in detail hereinbelow. It should be noted that the knowledge repository 254 may be located separate from the storage device 252 in an alternate embodiment. As an example, the operation manager 100 may be connected to an external database that comprises the knowledge repository 254.

Identifier portions of error message definitions are stored within an identifier portion 256 of the knowledge repository 254. A variable portion 258 is also located within the knowledge repository 254, which is provided for storing unique definitions for each property of the variable portion of error messages. In addition, textual descriptions of the unique definitions are provided within the variable portion 258. Preferably, network experts, product engineers, and/or others having knowledge of error messages that may be encountered as a result of products, services, or devices located within, provided, or connected to the system 102, provide property definitions of the error messages to the storage device 252, including the multiple definition properties of the variable portions.

The knowledge repository 254 also comprises a Bicnum number portion 262 herein a series of identification numbers, hereinafter referred to as Bicnums, are stored. As is explained in further detail hereinbelow, a single Bicnum number is assigned to each significant definition based on the contents of the variable properties. For example, error message may include two variable properties, with each property having three possible values. The knowledge repository could have up to nine additional entries to define each of the possible combinations of meanings of the two properties.

A rules portion 264 is also defined within the knowledge repository 254 for each Bicnum. Preferably, parsing, filtering, correlation, de-duplication and other processes to be performed on a particular error message are defined within the rules portion 264 of the knowledge repository 254. As shall be shown hereinafter, the rules portion may be used at different instances of processing of received error messages. It should be noted, however, that since the error message definitions are provided for each possible combination of meanings, the Bicnum associated with the most precise definition allows the Bicnum to represent the entire error message in subsequent processing. A single Bicnum correlates to a specific set of rules provided within the rules portion 264, which are to be performed to the Bicnum in accordance with a specific identifier or property of an error message. Once an event is indexed and assigned a Bicnum, it has specific attributes that define its behavior, such as, but not limited to, root cause proximity, filtering rules, de-duplication options and others as required. Further discussion of the use of rules in accordance with the preferred embodiment of the invention is provided with reference to FIG. 7, which is described in detail hereinbelow.

The knowledge repository 254 may also comprise other portions in accordance with functions performed by the operation manager 100. Examples of other portions that may be provided within the knowledge repository 254 are described in the co-pending patent application entitled "System and Method for Determining and Presenting Network Problems," by William McKenzie, et. al, filed on even date herewith, the disclosure of which is incorporated herein by reference.

It should be noted that the knowledge repository 254 may be continuously updated. Such updates may be performed local to the operation manager 100 via input devices 226 (FIG. 3). Alternatively, the updates may be provided via an Internet connection or another connection that attaches to the local interface 202 of the operation manager 100.

Figure 6:
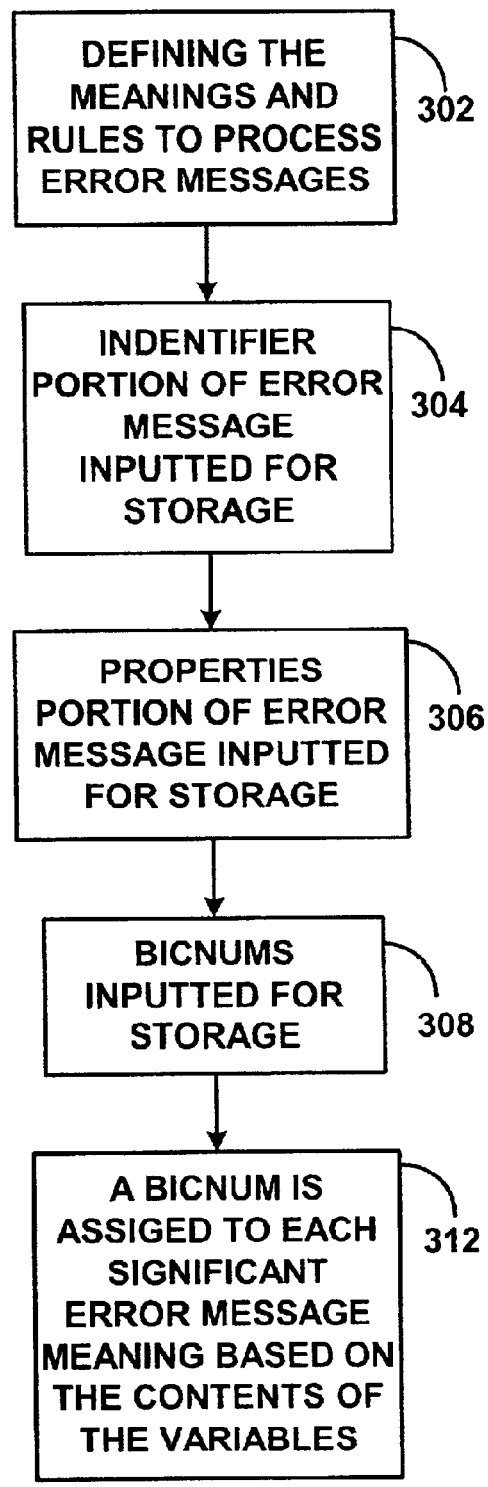
FIG. 6 is a flow chart that illustrates functionality performed to prepare the operation manager of FIG. 3 for receiving error messages.

FIG. 6 is a flow chart that illustrates functionality performed to prepare the operation manager 100 for receiving error messages in accordance with the preferred embodiment of the invention. With regard to the flow charts provided herein, each block represents a module, segment, or portion of code that comprises one or more executable instructions for implementing the specified logical function (s). In some alternate implementations, the functions noted in the blocks may occur out of the order noted. For example, two blocks shown in succession may in fact be executed in the reverse order, depending upon the functionality involved.

As shown by block 302, a product/software engineer determines what error messages may be attributed to the product/software with which they have provided for use within the system 102. It should be noted that this determination may be made prior to installation of the product/software into the system 102. The network expert then inputs the identifier portion of the error message for storage within the identifier portion 256 of the knowledge repository 254 (block 304). As shown by block 306, properties that are associated with the identifier are then provided by the network experts and stored within the variable portion 258 of the knowledge repository 254.

A series of Bicnums are then stored within the Bicnum portion 262 of the knowledge repository 254 (block 308). As noted hereinabove, a Bicnum may be assigned to each combination of identifier and each property of the variable (block 312), as is further explained hereinbelow. Preferably, when referring to a single error message, without variables, a single Bicnum will represent the entire message. Further, when referring to a single message with variables, a unique knowledge repository entry will be required for each significant meaning of the message based on the contents of the variables. Each of these entries will have a unique Bicnum identifier. The Bicnum entries can be shared by multiple enterprise error messages. For example, "link down" messages with unique enterprise identifiers can be mapped to a common set of "link down" knowledge repository entries.

It should be noted that more than one network expert may input error message definitions, including the identifier and properties, into the knowledge repository 254 from different locations. As an example, engineers may input portions of error messages to the knowledge repository 254 via the Internet, wherein a first engineer is located distant from a second engineer. It should be also noted that other individuals, besides the engineers, may input these error messages into the knowledge repository 254.

In accordance with an alternate embodiment of the invention, an engineer may store the error messages within a portable storage unit. The portable storage unit, such as a CD-ROM, may then be uploaded within the operation manager 100 via an input device 226 (FIG. 3) to provide the identifiers and properties of the identifiers within the identifier and variable portions 256, 258 respectively.

Figure 7:
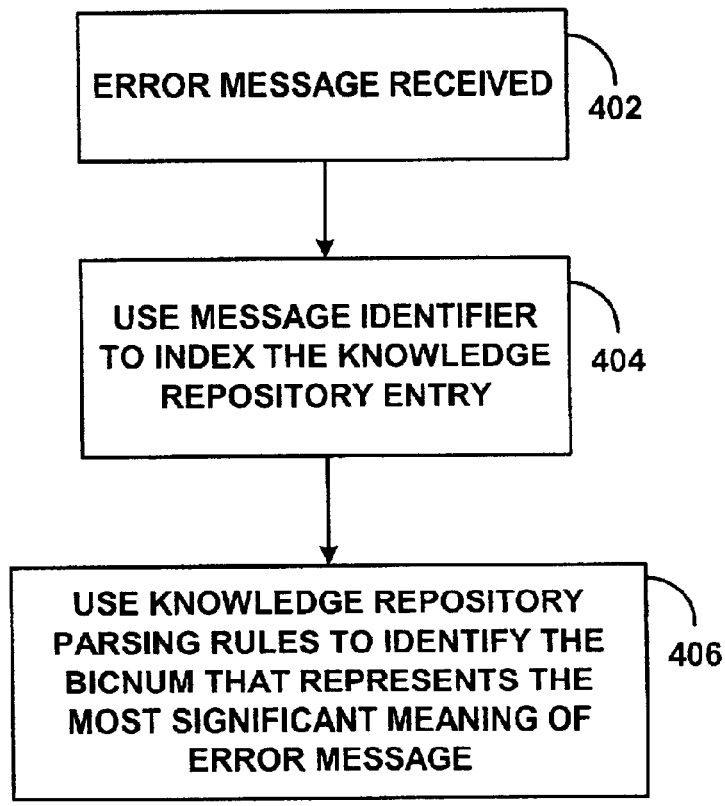
FIG. 7 is a flow chart that illustrates functionality performed by the operation manager of FIG. 3 upon receipt of an error message.

FIG. 7 is a flow chart that illustrates functionality performed by the operation manager 100 upon receipt of an error message. As shown by block 402, an error message is first received by the operation manager 100. When an error message has been received by the operation manager 100, the processor 204 (FIG. 3), located within the operation manager 100, uses the identifier portion 242 of the error message (block 404) to directly access the corresponding message definition in the knowledge repository 254. An example of an error message is shown hereinbelow with reference to table 1.

TABLE 1

| Identifier | Property 1 | Property 2 |
|---|---|---|
| .1.3.6.1.2.1.10.32.1 | 3 | 333 |

As shown hereinabove, the identifier portion 242 of the error message is .1.3.6.1.2.1.10.32.1, while the first and second properties of the variable portion 244, associated with the identifier, are 3 and 333 respectively. Therefore, the error message in accordance with the example comprises two properties and one identifier. It should be noted that the properties of the error message have no meaning unless the definitions of the properties have been provided prior to receiving the error message.

As shown by block 406, parsing code defined within the rules portion 264 of the knowledge repository 254, associated with the received message, is executed by the processor 204 (FIG. 3). The function of the parsing code is to examine the variable properties of the error message and to generate a Bicnum knowledge repository entry that will provide the subsequent rules required to process the error message. This Bicnum may also be used to index the appropriate textual description of the error message. An example of a knowledge repository 254 rules entry for this error message is shown hereinbelow with reference to table 2.

| Identifier | Bicnum | Property 1 | Property 2 | Parsing Code |
|---|---|---|---|---|
| .1.3.6.1.2.1.10.32.1 | 500 | 0 | N/A | Routine 406 |
| | 501 | 1 | N/A | |
| | 502 | 2 | N/A | |
| | 503 | 3 | N/A | |

The knowledge repository entries identified by Bicnum 501, 502, and 503 are refinements based on the variable contents identified by engineers. After executing the parsing code specified by the knowledge repository 254, (block 406), Bicnum 503 will be identified as the knowledge repository entry that best matches the meaning of the original error message. In accordance with this example, Bicnum 503 is the best match since a Bicnum value of 503 has been assigned for a property value of 3.

In this example, it may be noted that this parsing rule comprises adding the value of property 1 to the primary Bicnum 500 to generate the refined Bicnum. In other cases, the parsing rule may be more complex and possibly generate a refined Bicnum that represents multiply error messages. An example is the many enterprise "Link Down" messages, where each has its own unique message identifier, but in many cases will have common textual description and processing rules. This process will allow sharing of common textual descriptions and common processing rules. Note that network experts have identified property 2 as "not applicable" to the meaning of the error message processing and parsing code is only specified for the primary original error message entry.

As noted hereinabove, the original error message, after parsing, translates to a different Bicnum, namely 503. As shown, each identifier and each significant property is assigned a different Bicnum. Preferably, parsing, filtering, correlation, de-duplication and other processes are then performed upon the error message by using the rules identified in the knowledge repository entry identified by the assigned Bicnum. Rules defining the abovementioned functions to be performed upon the error message may be provided within the knowledge repository 254 within the rules portion 264. Use of the Bicnum for execution of functions defined by the rules increases efficiency of the operation manager 100 since the Bicnum is processed and not the entire error message.

In accordance with the preferred embodiment of the invention, if there is no correlation between the value of the identifier portion and the knowledge repository 254, then traditional legacy analysis of the error message is performed.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The following is claimed:

1. A system for processing an unsolicited error message, wherein said unsolicited error message is received as a result of a malfunction within a network, comprising:

a first computer, comprising:

a transceiver;

software stored within said first computer defining functions to be performed; and a processor configured by said software to perform the steps of:

receiving said error message;

parsing said error message to determine an identification number that represents a most significant meaning of said error message;

dividing said error message into an identifier portion and a series of properties portion, said identifier portion providing a general description of a cause of said error message and said series of properties portion providing specific attributes of said error message, wherein said identifier portion and said properties portion are used in determining said identification number;

generating said identification number by using an identifier of said identifier portion and at least one property value of said properties portion; and determining a description of said error message after said step of parsing said error message by using said identification number, wherein said identifier and said description are provided to said system prior to said receiving said error message.

2. The system of claim 1, wherein said malfunction is selected from a group consisting of malfunction of hardware, malfunction of software, or problems with provided services associated with said network.

3. The system of claim 1, further comprising a database that stores said identification number and text describing said most significant meaning of said error message.

4. The system of claim 1, wherein said processor is further configured by said software to perform the step of, processing said identification number in accordance with a set of rules that identify a process to be performed when an error message having said identification number is received.

5. The system of claim 1, wherein said identification number is used to identify parsing code associated with said identification number, wherein said parsing code may be executed to identify said most significant meaning of said error message.

6. A system for processing an unsolicited message, wherein said unsolicited error message is received as a result of a malfunction within a network, comprising:

a first computer, comprising;

means for receiving said error message;

means for parsing said error message when received to determine an identification number that represents a most significant meaning of said error message;

means for dividing said error message into an identifier portion and a series of properties portion, wherein said identifier portion provides a general description of a cause of said error message and said series of properties portion provides specific attributes of said error message, and wherein said identifier portion and said properties portion are used in determining said identification number;

means for generating said identification number by using an identifier of said identifier portion and at least one property value of said properties portion; and means for determining a description of said error message after said step of parsing said error message by using said identification number, wherein said identifier and said description are provided to said system prior to said receiving said error message.

7. The system of claim 6, wherein said malfunction is selected from a group consisting of malfunction of hardware, malfunction of software, or problems with provided services associated with said network.

8. The system of claim 6, further comprising a means for storing said identification number and text describing said most significant meaning of said error message.

9. The system of claim 6, further comprising a means for processing said identification number in accordance with a set of rules that identify a process to be performed when an error message having said identification number is received.

10. The system of claim 6, wherein said identification number is used to identify parsing code associated with said identification number, wherein said parsing code may be executed to identify said most significant meaning of said error message.

11. A method of processing an unsolicited error message, wherein said unsolicited error message is received as a result of a malfunction within a network, the method is performed by an operation manager comprising the steps of:

receiving said error message;

parsing said error message when received to determine an identification number that represents a most significant meaning of said error message;

dividing said error message into an identifier portion and a series of properties portion, wherein said identifier portion provides a general description of a cause of said error message and said series of properties portion provides specific attributes of said error message, and wherein said identifier portion and said properties portion are used in determining said identification number;

generating said identification number by using an identifier of said identifier portion and at least one property value of said properties portion; and determining a description of said error message after said step of parsing said error message by using said identification number, wherein said identifier and said description are provided to said operation manager prior to said receiving said error message.

12. The method of claim 11, wherein said malfunction is selected from the group consisting of malfunction of hardware, malfunction of software, or problems with provided services associated with said network.

13. The method of claim 11, further comprising the step of storing said identification number and text describing said most significant meaning of said error message.

14. The method of claim 11, further comprising the step of processing said identification number in accordance with a set of rules that identify a process to be performed when an error message having said identification number is received.

* * * * *